United States Patent

[11] 3,607,634

| [72] | Inventors | Claude J. O. L. Gerard<br>Erpent;<br>Fernand A. J. L. Lamproye, Haccourt;<br>Henri C. G. Piron, Liege, all of Belgium |
|---|---|---|
| [21] | Appl. No. | 782,623 |
| [22] | Filed | Dec. 10, 1968 |
| [45] | Patented | Sept. 21, 1971 |
| [73] | Assignee | Societe Anglo-Belge Vulcain<br>Brussels, Belgium |
| [32] | Priority | Aug. 27, 1964 |
| [33] | | Luxembourg |
| [31] | | 46,844<br>Continuation-in-part of application Ser. No.<br>482,830, Aug. 26, 1965, now abandoned. |

[54] PRESSURIZED NUCLEAR REACTOR WITH SIMPLIFIED ARRANGEMENT FOR DISTILLATION OF PRIMARY FLUID
10 Claims, 1 Drawing Fig.

[52] U.S. Cl. ...................................................... 176/54,
176/53, 176/57, 176/61

[51] Int. Cl. .................................................. G21c 19/30
[50] Field of Search .......................................... 176/53, 54,
56, 57, 61

[56] References Cited
UNITED STATES PATENTS

| 3,052,615 | 9/1962 | Johns et al. .................. | 176/55 |
| 3,150,051 | 9/1964 | Ammon ......................... | 176/53 |
| 3,201,319 | 8/1965 | Hackney et al. ............... | 176/54 |
| 3,222,255 | 12/1965 | Maldague ..................... | 176/39 X |
| 3,255,089 | 6/1966 | Deighton ...................... | 176/53 |
| 3,312,596 | 4/1967 | Grain ........................... | 176/54 |

*Primary Examiner*—Leland A. Sebastian
*Assistant Examiner*—S. Hellman
*Attorney*—Robert R. Priddy ABSTRACT: A nuclear reactor of the type having a boiler therein for distillation of primary fluid, in which reactor the internal arrangements have been simplified and the distilling operation rendered more efficient by location of the boiler in the thermal shield.

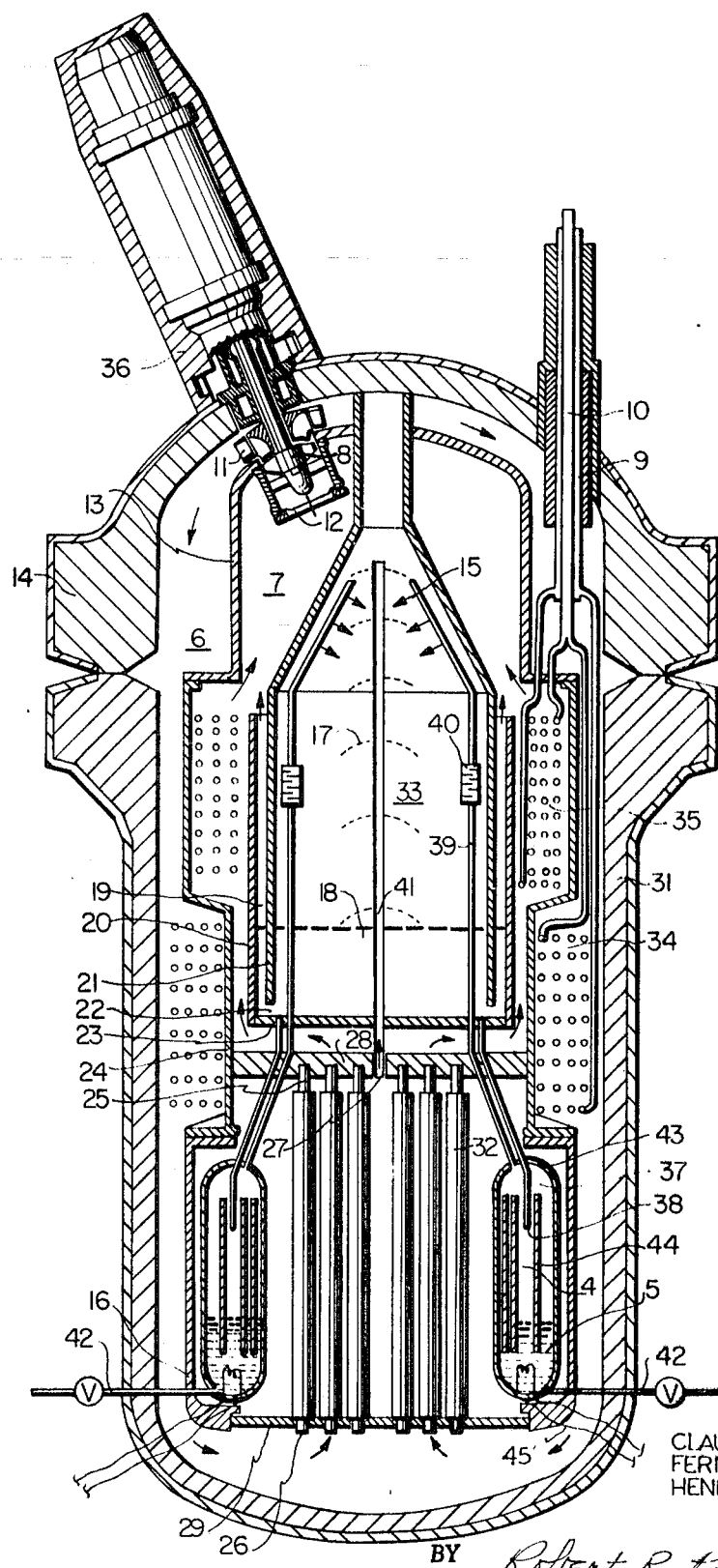
INVENTORS
CLAUDE J.O.L. GERARD
FERNARD A.J.L. LAMPROYE
HENRY C.G. PIRON
BY Robert R. Priddy
ATTORNEY

PRESSURIZED NUCLEAR REACTOR WITH SIMPLIFIED ARRANGEMENT FOR DISTILLATION OF PRIMARY FLUID

CROSS-REFERENCE TO RELATED APPLICATION

This application is a continuation in part of prior copending application Ser. No. 482,830, filed Aug. 26, 1965, now abandoned.

BACKGROUND

The "primary fluid" which flows through the primary circuit of a nuclear reactor is generally in a liquid state, but may be converted to a gaseous or vaprous form at one or more points in the circuit. Such fluid may, depending upon the type of reactor, perform various functions in addition to cooling the radioactive core. For instance, it may serve one or more of the functions of moderator, reflector, regulating fluid and others. The path along which the primary fluid flows in its circuit of the reactor containment vessel takes it around and/or through the radioactive core.

The lateral portions of the core are usually surrounded by a plurality of concentric thermal shield members of circular cross section and successively increasing diameters. For instance see U.S. Pat. No. 3,150,051, Ammon. These thermal shield members help protect the vital structural integrity of the containment vessel in that they intervene between the sides of the core and the vessel walls and absorb both large quantities of heat and a portion of the emitted neutron flux.

Because of the critical importance of cooling these shielding members, the primary fluid is also caused to flow around and between them. In order to avoid stagnation of the flow of primary fluid in localized areas between the thermal shielding members, leading to nonuniform cooling and excessive thermal and mechanical stress in the shields, they are closely spaced relative to one another. This helps insure a rapid rate of flow of the primary fluid with consequent reduction in the tendency for areas of stagnant flow to form.

In connection with the utilization of the primary fluid for some of the functions which have been referred to above, it has been found useful to distill the primary fluid. For instance, during the operation of a reactor, a continuous or incremental flow of primary fluid may be withdrawn from the reactor vessel to an external distillation unit in which the primary fluid is distilled to free it of impurities, e.g. corrosion products, following which the purified primary fluid is returned to the primary circuit in the reactor. Where soluble poisons are injected into the primary fluid in a controlled manner to regulate the reactor, thus utilizing the primary fluid as a regulating fluid, the poison concentration and therefore the regulating effect of the primary fluid may be controlled in such a distillation operation.

The distillation operation is conducted in a distillation apparatus which may be provided with electric or neutron-absorbing heating means, or which may be a heat exchanger. In Pierre E. J. M. Maldague's U.S. Pat. No. 3,222,255, it is suggested that a heat exchanger connected with a primary fluid distillation unit be located in the nuclear reactor vessel above a pressurizing chamber which is located between the core and the heat exchanger. The exchanger is positioned above the core and the pressurizer to provide gravity return flow of condensed liquid to the pressurizer.

In the Ammon patent, mentioned above, there is also a disclosure of a boiler provided for a different purpose in the vessel of nuclear reactor. The boiler is situated well above the core and above the thermal shielding members, where it will not interfere with the flow of primary fluid between the thermal shielding members.

BRIEF DESCRIPTION OF THE PRESENT INVENTION

We have found that the internal arrangement of a reactor having a primary fluid boiler within its containment vessel can be considerably simplified by combining the boiler and the thermal shielding means. Thus, in accordance with the invention, the thermal shield is at least in part a tank, located alongside and adjacent the core, which also serves as a boiler. The tank, if desired, may have a toroidal configuration so as to completely surround the core, or may only partially surround the lateral portions of the core. In the latter case, conventional thermal shielding means may surround the remaining lateral portions of the core. The invention is applicable to any water-cooled nuclear reactor having a thermal shield, but is illustrated hereinafter in connection with a reactor having an internal pressurizer located above the core, the boiler being located below the pressurizer alongside the core and being interconnected with the pressurizer by a liquid-filling pipe and a vapor return pipe. The boiler in the thermal shield is operated in conjunction with a cold source for condensing vapor formed in the boiler. The cold source may be any thermal mass which is at a temperature lower than the saturation temperature of the fluid in the boiler, but is most preferably a fluid spray of primary fluid released in the pressurizer. Accordingly, the boiler is operated at a temperature substantially higher than that prevailing within the pressurizer.

In order to provide a fuller understanding of the invention, reference is made to the accompanying drawing and to the following description of the preferred or best mode of embodying invention, neither of which however should be considered as restricting the invention to the exact details set forth therein.

BRIEF DESCRIPTION OF THE DRAWING

The single FIGURE of drawing is a vertical sectional view taken on the longitudinal axis of a generally vertical containment vessel containing a reactor in accordance with the present invention.

DESCRIPTION OF A PREFERRED EMBODIMENT

The reactor shown in the drawing includes a vessel 31 provided with a cap 14, which is held in place by means of studs (not shown). Together, the vessel and the cap form a pressure enclosure. Supported on cap 14 are 3 pumps 36, only one of which has been shown. Each pump 36 is secured to the cap 14 by flanges and is of the canned rotor and stator type, the shaft of which passes through the lid and carries a rotor 8 situated inside the pressure enclosure.

Within the pressure enclosure are lower, intermediate and upper shells, 16, 24 and 13, respectively, which divide the interior of the pressure enclosure into inner and outer portions 7 and 6, respectively. The upper shell 13 and the pump 36 are so arranged that the pump intake 12 is within the shell 13 and the pump discharge 11 is outside the shell 13 between it and the cap 14.

Inside the intermediate shell 24, in an enlarged portion thereof, is located a first set of heat exchanger bundles 35. Below heat exchanger bundles 35 in a necked-down portion of intermediate shell 24, between it and the interior wall of vessel 31, is a second set 34 of heat exchanger tube bundles. Heat exchanger tube bundles 34 and 35 are connected by appropriate conduits to concentric hot coolant feed pipe 10 and return pipe 9, which pass through the cap 14 to any suitable device in which the thermal energy imported to the primary fluid in the reactor is consumed.

Lower shell 16 and intermediate shell 24, respectively, support foot and headplates 29 and 28 respectively, which in turn support the feet 26 and heads 25 of fuel elements 32, constituting the core of the reactor. Both the footplate 29 and headplate 28 are provided with apertures (not shown) to provide for circulation of fluid from beneath the footplate through the core and out of and above the headplate.

Above head plate 28 within the inner portion 7 the pressure enclosure formed in part by intermediate and upper members 24 and 13 is a pressurizer 33. The pressurizer is an enclosure having base 23 and sidewalls 21. The lower edges of sidewalls 21 are raised slightly above the base 23 to provide an outlet 22. A weir 20, concentric with and closely adjacent to sidewall 21 and extending upwardly along a substantial portion of sidewall 21, provides a narrow annular space 19 through which may pass liquids and vapors from the interior of pressurizer 33 into the inner portion 7 of the pressure enclosure. Through a port 27 in headplate 28 and through the base 23 of the pressurizer passes a water atomizer 41 having outlets for spraying atomized water 17 into the upper portion of pressurizer 33, whereupon said atomized water may fall into a reservoir 18 maintained in the lower portion of the pressurizer.

All of the reactor components described thus far in this description of a preferred embodiment are known to those skilled in the art, so that their manner and materials of construction need not be further described.

As is conventional in reactors of the type just described, a thermal shield encircles the core, which includes fuel elements 32. However, contrary to prior practice, the thermal shield includes one or more boilers. In the boiler or boilers, heat energy absorbed in the thermal shield is used for evaporating primary fluid contained within the boiler. The number, dimensions and shape of the boilers may vary widely. Its function is double. It protects the vessel against radiation, as is usually the case, but it has the further function of insuring the transfer of the heat absorbed from the core to the primary fluid which is to be evaporated in the boiler. The boiler may be visualized as being included in a circuit which includes the boiler itself as well as ducts connecting the boiler to the main circuit of the reactor, through which the primary fluid flows such ducts serving on the one hand to remove primary fluid from the main circuit in liquid form and on the other hand to return this same fluid to the main circuit in the form of vapor.

In order for boiling to be feasible locally within a circuit, such as the boiler circuit described above, it is necessary to have available a cold source which condenses the vapor resulting from the boiling operation. By such condensation, the total pressure prevailing in the fluid in the boiler circuit may be maintained substantially equal to the pressure of saturation at the particular temperature at which the fluid is maintained. The cold source may be any thermal mass maintained at a temperature lower than the temperature of saturation. It is advantageous to use as the thermal mass the vapor in the pressurizer of a reactor having a pressurizer. This is possible because of the fact that the atomized water in the pressurizer is at a lower temperature than the vapor generated in the thermal shield. Thus, the need for a separate cold source is eliminated and the system is thus simplified. However, if it is desired to employ the invention in a reactor having no pressurizer, then a condenser in the reactor vessel supplied with cooling fluid from outside the reactor may be employed as the cold source.

The heating of the liquid in the boiler in the thermal shield may be assisted by providing heating elements which have a high neutron capture cross section and by situating them within the boiler in contact with the liquid to be evaporated. Also, electrical resistances may be placed in the boiler in contact with the fluid. Moreover heat exchanger tubes may be placed in the boiler in contact with the fluid to be evaporated and a heating fluid having a temperature higher than the temperature of saturation of the primary fluid may be circulated through these heat exchanger tubes.

The feeding of the boiler with liquid from the primary circuit may be accomplished by gravity flow or, if a cold source other than the pressurizer is used, it may be necessary to feed the boiler by forced flow. In any event, however, the feed rate of liquid to the boiler should correspond to the disappearance rate of fluid attributable to vapor production. Care should also be taken to see that the fluid contained in the boiler will not escape through the feeding conduits back into the primary circuit.

In accordance with the preferred embodiment or the invention shown in the drawing, the thermal shield comprises outer walls 43 defining a toroidal enclosure or tank 37 adjacent the side of the core, in which may be located neutron-absorbing heating elements 44 and, if desired, electrical heater elements 45. Waste outlets 42 are provided to permit continuous or discontinuous purging of liquid 5 in the lower portion of the boiler. Liquid transfer pipes 38 in communication with the reservoir 18 of liquid in pressurizer 33 extend through outer wall 43 into the interior of boiler 37. Vapor transfer pipes 39 in communication with the vapor space 4 in the upper portion of boiler 37 extend up through headplate 28, through the base 23 of the pressurizer and up to the upper portion of the vapor space of the pressurizer. The vapor transfer pipes 39 are provided with liquid separators 40 for trapping any brine entrained in the vapors discharged from boiler 37 and with vapor outlets 15 which are positioned for discharging the vapor into the atomized water 17 in the pressurizer. From the foregoing, it is apparent that in present embodiment, the pressurizer constitutes the condensation chamber for the boiler circuit and the cold source in the condensation chamber includes the atomized water 17. Moreover, the walls and construction materials of the pressurizer and the reservoir 18 of water present in the bottom of the pressurizer also contribute to the cold source.

In the operation of a reactor containing the system just described, the boiler system and its associated components do not materially alter the basic mode of operation of the core, pressurizer and the remainder of the main circuit for the primary fluid. The primary fluid circulates in a conventional manner from the inner portion 7 of the pressure enclosure into the rotor 8 of pump 36 and outwardly into the outer portion 6 of the pressure enclosure. From thence it flows over heat exchanger tube bundles 34 and from thence to the bottom of the vessel. From the bottom of the vessel, the fluid flows upwardly through footplate 29, through the core, fuel elements 32, and through the headplate 23. A portion of the primary fluid which has passed through the core is drawn through port 27 and atomizer 41 into the pressurizer 33 where it is discharged from atomizer 41 as atomized water 17. The remainder of the water or other primary fluid which has passed through the core passes around the outside of weir 20 surrounding the pressurizer and through the heat exchanger tube bundles 35 back to pump intake 12. Overflow water from the reservoir 18 which accumulates in the pressurizer flows out of the outlet 22 and up through the space 19 between weir 20 and inside wall 21 of the pressurizer and back to the pump intake 12 along with the remainder of the primary fluid.

It will be observed that the interior of the pressurizer constitutes a portion of the main circuit through which flows the primary fluid in the reactor. Water to be purified is taken from the reservoir 18 in the bottom of the pressurizer and flows by gravity into the boiler 37 through conduits 38. The demand for withdrawal of liquid from the reservoir 18 is inherently associated with the outflow of vapor from the boiler. The liquid introduced into boiler 37 is brought to a boil by contact with neutron-absorbing heating elements 44 and the vapor thus produced escapes through the conduits 39. The diameters of the conduits 39 are chosen so as to accommodate a flow of vapor corresponding to the energy evolved by radiation in the walls 43 and elements 44 of the thermal shield and boiler 37. The conduits 39 carry the vapor above the level of the water in the pressurizer and through the liquid separators 40, which causes any brine contained in the vapor to flow back down through the pipes 39 into the boiler 37. The vapor discharged from vapor outlets 15 is condensed in the pressurizer mainly by contact with the atomized water 17, which has a large exchange surface. When the reactor is shut down, the electrical heating elements 45 may be used to give additional heat, if necessary, to continue the evaporation during the shut down.

It should be noted that in the system just described, there is a natural flow of fluid in the boiler circuit. The vapor produced in the boiler separates from the liquid and the impurities present therein, and it flows into the pressurizer where it is condensed. The amount of liquid which disappears due to generation of vapor leaving the boiler is replaced by liquid coming from the pressurizer, with which the boiler is directly connected, and the pressures in the boiler and the pressurizer are substantially the same.

What is claimed is:

1. In a pressurized, fluid-cooled nuclear reactor including a vessel and having within that vessel a core, a thermal shield member located around said core, a primary circuit which passes through the core, and a boiler located in said vessel, the improvement characterized in that a portion of the walls of said thermal shield includes a hollow closed structure defining a boiler chamber for distillation of liquid primary fluid, with liquid and vapor transfer means extending between said boiler chamber and said primary circuit.

2. A reactor in accordance with claim 1 wherein said thermal shield and the therein-defined boiler chamber are of annular cross section and are disposed in surrounding relationship to and alongside the core.

3. A reactor in accordance with claim 1 wherein a heating means is mounted in said boiler chamber.

4. A reactor in accordance with claim 3 wherein said heating means includes an electrical resistance element and means for conducting electricity thereto.

5. A reactor in accordance with claim 3 wherein said heating means includes a neutron-absorbing member suspended in said boiler chamber for absorbing neutrons emitted by the core and for heating liquid primary fluid in said boiler chamber with heat generated by such absorption.

6. A reactor in accordance with claim 1 wherein a pressurizer chamber, constituting a portion of said primary circuit, is located in said vessel above said core and said thermal shield, and said liquid and vapor transfer means communicate between the interiors of said pressurizer chamber and boiler chamber.

7. In a pressurized fluid-cooled reactor including a vessel, and having within that vessel a core, a thermal shield member located around said core, a primary circuit which passes through said core, and a pressurizer chamber included in said primary circuit and located above said core in said vessel, the improvement characterized in that a portion of the wall of said thermal shield includes a hollow closed structure defining a boiler chamber surrounding and alongside said core for distillation of said primary fluid, with vapor and liquid transfer pipes communicating between the interiors of said pressurizer and boiler chamber.

8. A pressurized water-cooled reactor including a vessel, radioactive fuel elements in said vessel, a thermal shield member closed to the reflector in said vessel, a portion of the walls of said thermal shield including a hollow, closed structure defining a boiler chamber surrounding and alongside said core for vaporizing liquid primary fluid from the lower portion of said boiler chamber into a boiler vapor space in the upper portion of said boiler chamber; a pressurizer chamber above said fuel elements and boiler chamber in said vessel having an upper portion constituting a vapor space and a lower portion for containing a body of liquid primary fluid, means for withdrawing primary fluid from the core and for atomizing the withdrawn primary fluid in the vapor space in the upper portion of said pressurizer; a first conduit means communicating between the lower portions of said pressurizer and boiler chambers for conveying liquid primary fluid from the lower portion of the pressurizer chamber to the lower portion of the boiler chamber; a second conduit means communicating between the vapor spaces of said pressurizer and boiler chambers for conveying vaporized primary fluid from the boiler chamber to the pressurizer chamber and for contacting the vaporized primary fluid with said atomized primary fluid in the pressurizer chamber vapor space; and conduit means communicating between the lower portion of the boiler chamber and the exterior of the vessel for purging said lower portion.

9. A method of distilling primary coolant fluid containing impurities, in a pressurized, fluid-cooled nuclear reactor including a vessel, a core in said vessel, a primary coolant circuit providing for circulation of coolant through said core, a thermal shield member, a portion of the wall of which includes a hollow, closed structure defining a boiling chamber in said thermal shield member adjacent to and alongside at least a portion of said core for use in distilling and purifying said primary coolant, a pressurizer chamber which is located above said boiling chamber and said core and which is in communication with said primary circuit, and liquid and vapor transfer means extending between said boiling chamber and said pressurizer, said method comprising the following steps: conducting liquid primary coolant fluid downwardly from its position above said core in said pressurizer through said liquid transfer means to said boiling chamber adjacent and to and alongside said core; vaporizing said liquid in said boiling chamber at least in part with heat transferred from the core through the walls of said thermal shield defining said boiling chamber; conducting the resultant vapors upwardly from said boiling chamber through said vapor transfer means to said pressurizer chamber; condensing said vapors in said pressurizer chamber; returning the resultant purified condensate to the primary circuit of the reactor; and periodically purging said boiling chamber of impurities.

10. In a method in accordance with claim 9 wherein said nuclear reactor includes a pressurizer chamber having means for atomizing liquid primary fluid in a vapor space in the upper portion of said pressurizer chamber, the step which comprises condensing said vapors by bringing them into contact with said atomized fluid in said pressurizer.